(12) United States Patent
Zimmer

(10) Patent No.: US 6,964,079 B2
(45) Date of Patent: Nov. 15, 2005

(54) WIPER ARM

(75) Inventor: Joachim Zimmer, Sasbach (DE)

(73) Assignee: Robert Bosch GmbH, (DE)

( * ) Notice: Subject to any disclaimer, the term of this patent is extended or adjusted under 35 U.S.C. 154(b) by 77 days.

(21) Appl. No.: 10/485,902

(22) PCT Filed: Sep. 26, 2002

(86) PCT No.: PCT/DE02/03635

§ 371 (c)(1),
(2), (4) Date: Feb. 4, 2004

(87) PCT Pub. No.: WO03/072407

PCT Pub. Date: Sep. 4, 2003

(65) Prior Publication Data

US 2005/0050668 A1  Mar. 10, 2005

(30) Foreign Application Priority Data

Feb. 27, 2002 (DE) ................................ 102 08 537

(51) Int. Cl.[7] .............................. B60S 1/32; B60S 1/34
(52) U.S. Cl. .................... 15/250.351; 29/505; 29/509; 29/897.2
(58) Field of Search .................... 15/250.351, 250.352, 15/250.31, 250.34; 29/505, 509, 897.2; 403/274

(56) References Cited

U.S. PATENT DOCUMENTS

| 5,652,994 A | 8/1997 | Egner-Walter et al. | |
| 6,216,310 B1 * | 4/2001 | Thibaut | 15/250.351 |
| 6,505,377 B1 * | 1/2003 | Merkel et al. | 15/250.351 |
| 2003/0005541 A1 * | 1/2003 | Merkel et al. | 15/250.351 |
| 2003/0145413 A1 * | 8/2003 | Zimmer | 15/250.351 |

FOREIGN PATENT DOCUMENTS

| DE | 2159267 | * | 6/1973 |
| DE | 39 26 714 A | | 2/1991 |
| DE | 196 20 355 A | | 11/1997 |
| DE | 197 35 301 A1 | | 2/1999 |
| DE | 100 20 004 A | | 11/2001 |

* cited by examiner

Primary Examiner—Gary K. Graham

(74) Attorney, Agent, or Firm—Michael Best & Friedrich LLP

(57) ABSTRACT

The invention starts with a wiper arm (10), which includes a fastening part (14) and an articulated part (16) with a wiper rod (18), of which at least one part (14, 16, 18) is fabricated of sheet metal by stamping and bending and features at least one area with several sheet metal layers (26, 28). It is proposed that an external sheet metal plate (26) and an internal sheet metal plate (28) lying on top of one another are jointly bent around a bending edge (52), whereby the external sheet metal plate (26) features connecting toes (32) on its side edges (54) that run longitudinally to the bending edge (52), which engage in matching recesses (30) on the corresponding side edges (56) of the internal sheet metal plate (28), and, after bending under an initial tension, the internal sheet metal plate (28) is adjacent to the external sheet metal plate (26).

8 Claims, 4 Drawing Sheets

WIPER ARM

STATE OF THE ART

Figure 1:
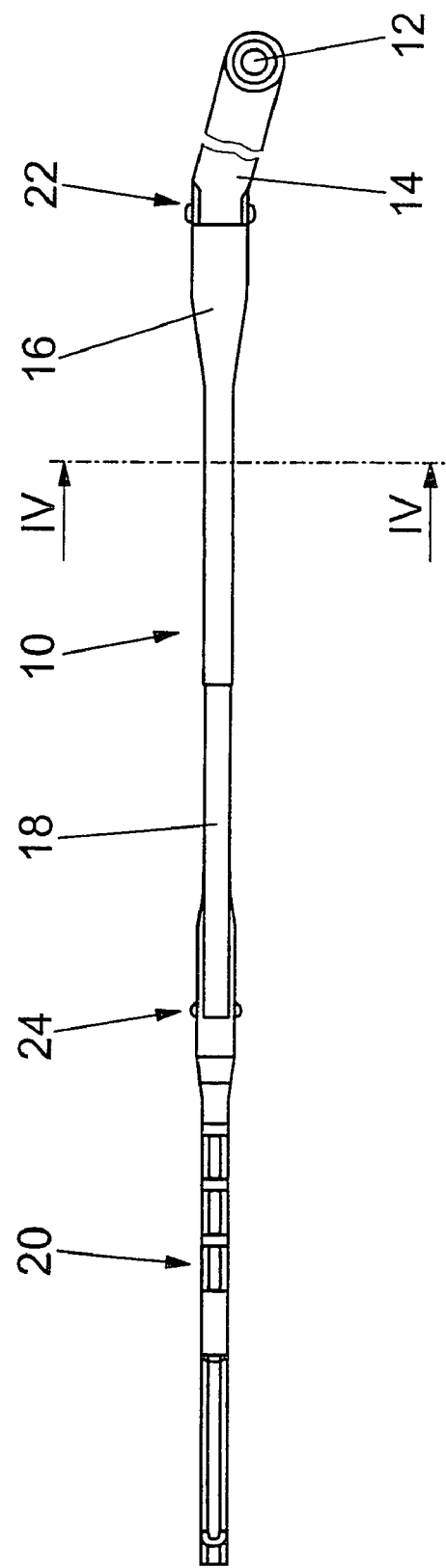

Known windshield wipers have a wiper arm, which is constructed of a driven fastening part, an articulated part connected to it via a hinged joint and a wiper rod attached to the articulated part. In addition, the windshield wiper has a wiper blade linked to the wiper rod and the wiper blade is composed of a supporting element and wiper strip held by it.

The fastening part, the articulated part and the wiper rod that is possibly formed thereon are frequently sheet metal bent parts that are formed by stamping, bending and deep-drawing. Their shape is influenced by different requirement and stresses. As a result, the wiper arm is supposed to be as torsion-proof, resistant to bending and low in vibrations as possible, and to not impair the driver's the field of vision. Known wiper arms have a relatively wide fastening part and, as a rule, feature a U profile that is open towards the window of the motor vehicle.

A wiper arm with a fastening part and an articulated part with a formed-on wiper rod is known from DE 197 35 301 A1. At least one of the constructed components is formed of sheet metal, whereby a different number of sheet metal layers can be folded over one another in various areas depending upon the stress until material thickness required for the respective cross-section is achieved. In this process, the material can be folded over by approx. 180° once or multiple times, or removed surface areas can be put together in one or preferably several steps in order to mutually support each other.

As a result, sheet metal parts can be produced from one relatively thin, flat sheet metal panel and these sheet metal parts can have different material thicknesses, which are adapted to the expected stresses, in different areas. The sheet metal parts have contour and folded surfaces. The contour surfaces are used for the basic shaping of the sheet metal part and the folded surfaces for the fastening areas and in order to achieve different material thicknesses. The stamping and bending process is relatively costly. In addition, it is only possible to achieve wall thicknesses that represent a multiple of the wall thickness of the source sheet metal. Finally, the sheet metal parts can be composed of only one material.

ADVANTAGES OF THE INVENTION

According to the invention, an external sheet metal plate and an internal sheet metal plate of a part of the wiper arm lying on top of one another are jointly bent around a bending edge, whereby the external sheet metal plate features connecting toes on its side edges that run longitudinally to the bending edge, which engage in matching recesses on the corresponding side edges of the internal sheet metal plate. During the joint bending around the bending edge, the external sheet metal plate experiences a bending radius that is greater than the bending radius of the internal sheet metal plate by the thickness of the internal sheet metal plate so that the connecting toes are pulled into the recesses and end up adjacent to the base of the recesses. In doing so, the width of the external sheet metal plate is coordinated with the width of the internal sheet metal plate and the depth of the recesses in such a way that the external sheet metal plate completely covers the internal sheet metal plate and an initial tension is generated between the external sheet metal plate and the internal sheet metal plate. After bending, the internal and external sheet metal plates are connected to one another free of play and with positive engagement, and possess an increased total rigidity.

The sheet metal layers that lie on top of one another are arranged at those locations at which great stress occurs, which is caused by external forces, such as frictional or inertia forces, as well as internal forces, e.g., tensile force in the area of the spring suspension. The wiper arm therefore receives reinforcement at precisely the locations at which it is functionally required for reasons of strength or for reasons related to manufacturing engineering. Material is saved and the weight is reduced as compared with known solutions by reinforcing the wiper arm in a function-oriented and stress-oriented manner and also by manufacturing it of a thin-walled sheet metal. At the same time, less weight also means lower forces of inertia, which are generated by the oscillating movement, so that the wiper drive can also have correspondingly smaller dimensions.

According to the invention, it is possible for both the same material to be structured in multiple layers or else high-strength materials to be paired with light-weight materials, e.g., aluminum. The pairing of steel and aluminum materials is unproblematic due to a surface treatment of the steel material with an aluminum-like coating. Steel sheet metal with this coating, e.g., Galfan, can be obtained as coated strip stock and is already in use with known wiper arms since, along with the weight advantage, it is also easy to paint.

Material use can be advantageously varied for the individual areas of the wiper arm and selected according to the stress and function. As a result, materials that are sufficiently ductile are used at locations that are riveted or crimped, and stronger and more brittle materials are used at other locations at which the requirements for deformability are not high. In an embodiment of the invention, the external and internal sheet metal plates are formed from a sheet metal strip and placed on top of one another via folding by 180° and further processed into a multilayer component. This variation is particularly suited for reinforcing end areas.

The invention provides for several possibilities for arranging the sheet metal, which fulfill different functions and can be used as needed. In a first variation, the internal sheet metal plate serves as a partial reinforcing sheet metal plate. In this case, it reinforces particularly stressed areas of the external sheet metal plate and is not externally visible. Its strength can be greater than that of the external sheet metal plate, which for its part can have a better corrosion resistance and/or a lower weight.

In a second variation, the component is composed of two single-layer parts, which overlap only in a connection area and are connected to one another during the bending process. In this case, in the connection area, a sheet metal part is fashioned as an external sheet metal plate with several connecting toes and the other sheet metal part is fashioned as an internal sheet metal plate with the corresponding recesses. So that the two sheet metal parts have an outer contour that is adapted to one another outside the connection area, the sheet metal part embodied as the internal sheet metal plate has, in the connection area, an impressed step that corresponds to the sheet metal thickness of the sheet metal part serving as the external sheet metal plate. After the bending process, both sheet metal parts are connected to one another free of play and with positive engagement, and their outer contours are adapted to one another. They merely have a joint on the transition, which is seen externally as a design element. In this case as well, it can be expedient to use different materials.

All sheet metal layers are manufactured advantageously from a flat sheet metal strip with the aid of known processes and, after the stamping, have the outer contours including connecting toes and recesses. In a subsequent procedural step, these sheet metal layers are placed on top of one another so that the connecting toes are aligned with the recesses. Then the internal sheet metal plate and the external sheet metal plate are jointly bent in a bending tool around a bending edge of a tool core. Since the outer contours of the individual sheet metal layers essentially do not deviate from sheet metal parts of known wiper arms, the same tools can be used. The expense of adapting the two sheet metal layers around the bending tool is not very high since the two are deformed simultaneously. If the wiper arm is supposed to be reinforced by a partial reinforcing sheet metal plate made of the same material, this can be stamped out of the same sheet metal strip by arranging it, for example, in the area of the clippings that would otherwise be incurred, thereby leading to better material utilization.

DRAWINGS

Additional advantages are yielded from the following description of the drawings. Exemplary embodiments of the invention are depicted in the drawings. The drawings, the description and the claims contain numerous features in combination. The expert will also observe individual features expediently and combine them into additional, meaningful combinations.

The drawings show:

FIG. 1 A top view of a wiper arm.

Figure 2:
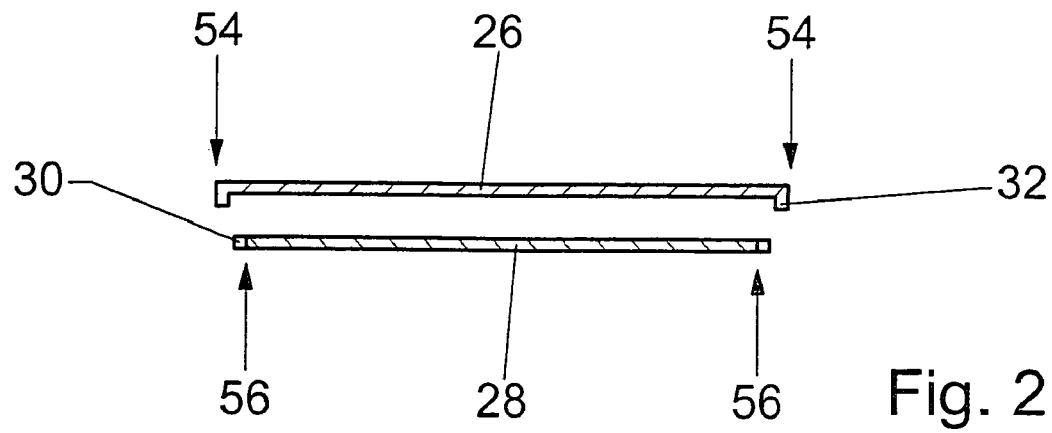
Figure 3:
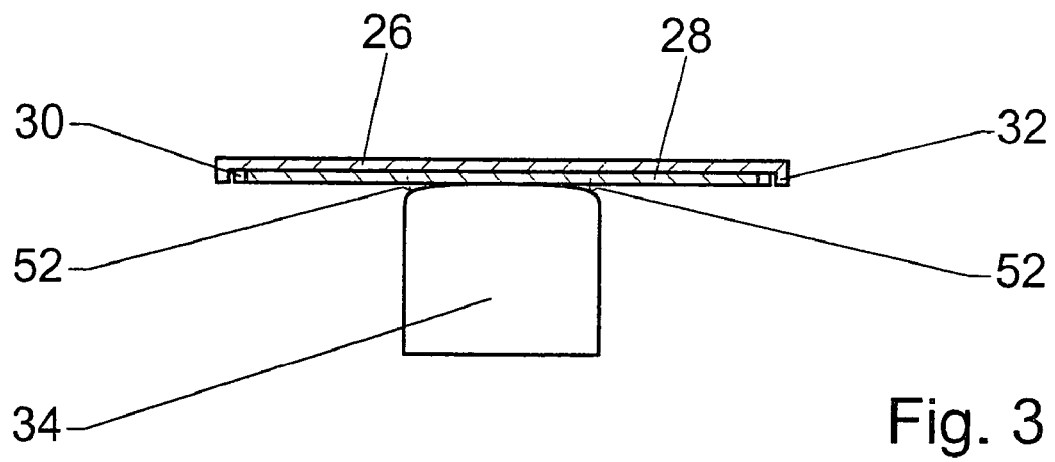
Figure 4:
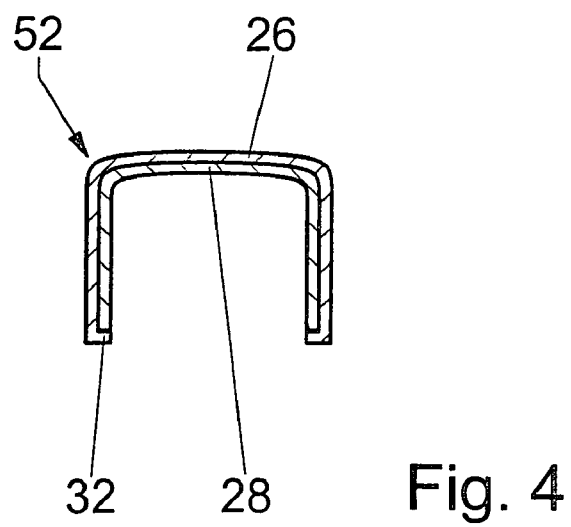

FIGS. 2–4 Individual procedural steps for fabrication in a section of the wiper arm according to a Line IV—IV in FIG. 1.

Figure 5:
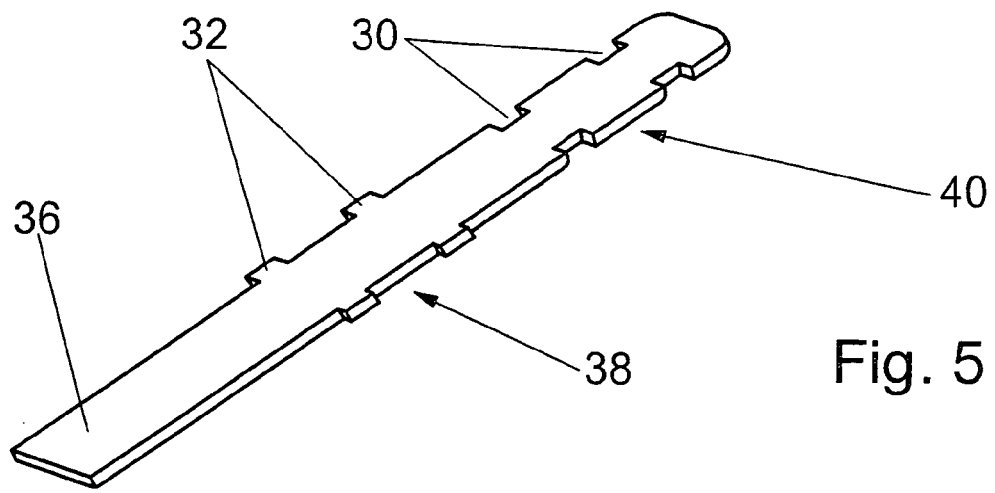
Figure 6:
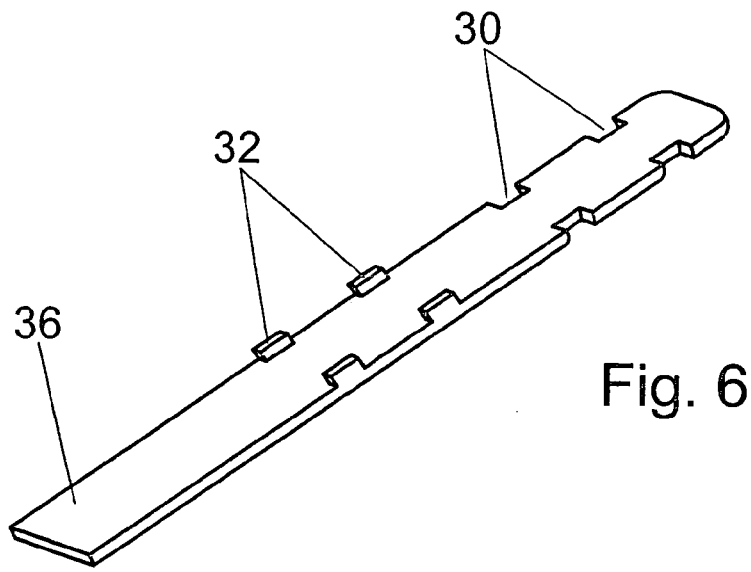
Figure 7:
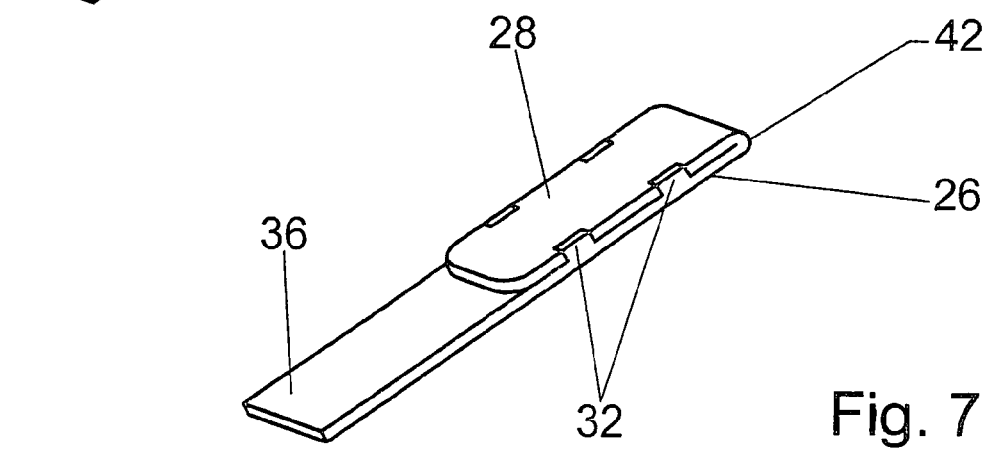

FIGS. 5–7 Individual procedural steps for producing a double layer sheet metal strip.

Figure 8:
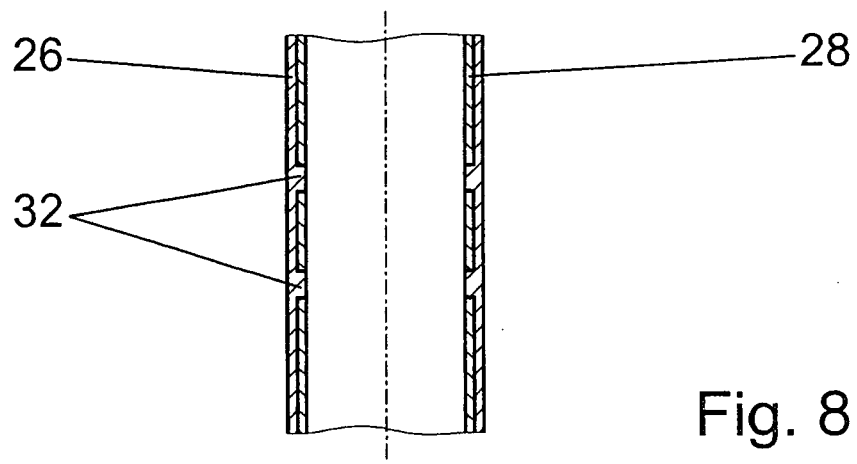
Figure 9:
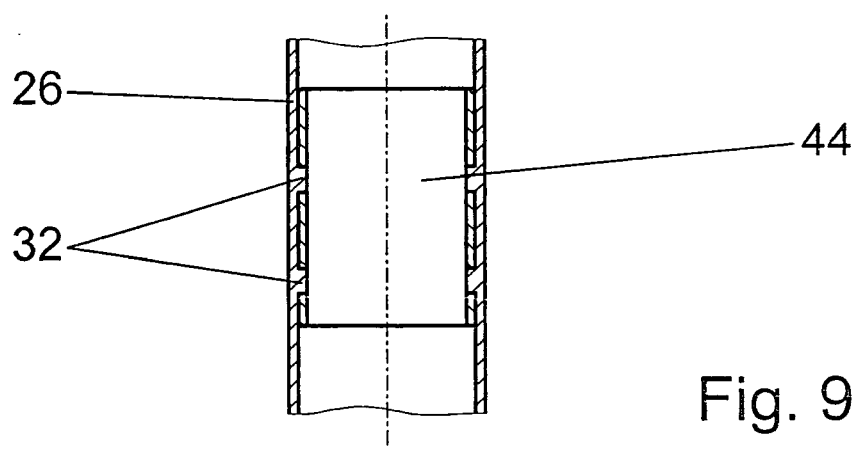
Figure 10:
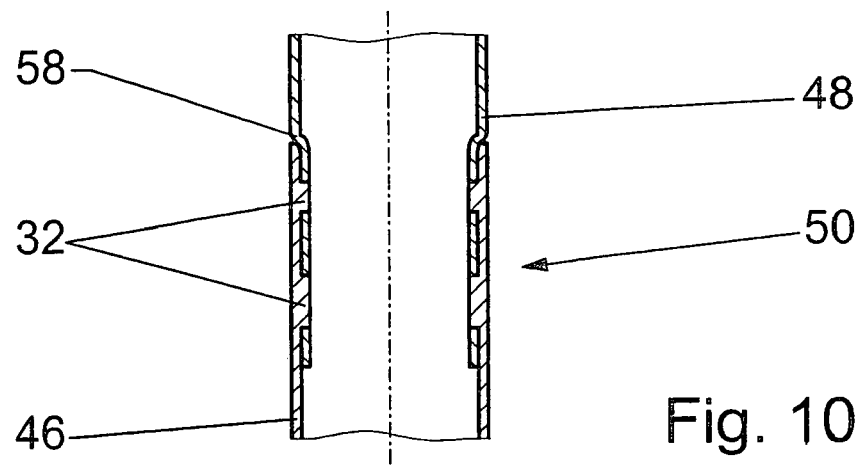

FIGS. 8–10 Views from below of various application variations.

DESCRIPTION OF THE EXEMPLARY EMBODIMENT

A wiper arm 10 of a windshield wiper for a motor vehicle transmits the driving torque from a drive shaft 12 to a wiper blade 20. It has a fastening part 14, which sits with one end on the drive shaft 12 and its other end is connected via a hinged joint 22 to an articulated part 16 (FIG. 1). A wiper rod 18 is connected to the free end of the articulated part 16 and the wiper rod is connected to the wiper blade 20 via a joint 24. The fastening part 14 and the articulated part 16 as well as the formed-on wiper rod 18 are sheet metal bent parts and have a U profile that is open towards the window of the motor vehicle. In order to guarantee the required rigidity and strength over the length of the wiper arm 10, at least several areas of the sheet metal bent parts 14, 16, 18, which are subject to higher stress or have devices for a tension spring, are embodied with double walls. A section corresponding to sectional line IV—IV in FIG. 1 is depicted as an example in FIG. 4.

The articulated part 16 is formed in this area of two sheet metal layers, whereby an internal sheet metal plate 28 under an initial tension is adjacent to an external sheet metal plate 26 (FIG. 4). On its side edges 54 the external sheet metal plate 26 has several connecting toes 32, which are bent by 90° to an adjacent area after being stamped out of a flat sheet metal panel (FIG. 2). The internal sheet metal plate 28 is also stamped out of a flat sheet metal panel, with several recesses 30 being simultaneously produced on the side edges 56. The internal sheet metal plate 28 and the external sheet metal plate 26 can be composed of the same or different materials. Combinations of the same material are arranged at those locations at which great stress occurs, while, for example, combinations with ductile materials are used at locations where riveting or crimping will occur in the subsequent manufacturing process.

In a further procedural step, the external sheet metal plate 26 is placed on the internal sheet metal plate 28 and namely in such a way that the connecting toes 32 align with the recesses 30. The aligned sheet metal plates 26, 28 are then bent around a bending edge 52 of a tool core 34 in a bending tool (FIG. 3). The width of the external sheet metal plate 26 and the width of the internal sheet metal plate 28, as well as the depth of the recesses 30, are coordinated with one another in such a way that, during bending, the connecting toes 32 are pulled into the recesses 30 and end up adjacent to the end of the recesses 30, whereby at the end of the bending process an initial tension is generated between the external sheet metal plate 26 and the internal sheet metal plate 28, which guarantees a connection that is free of play, torsion-proof, and resistant to bending (FIG. 4).

In an embodiment of the invention, the external sheet metal plate 26 and the internal sheet metal plate 28 are arranged one after the other in the longitudinal direction and stamped out of a sheet metal panel. A stamped sheet metal strip 36 is fashioned in a first area 38 as an external sheet metal plate 26 with connecting toes 32 and in a second area 40 as an internal sheet metal plate 28 with recesses 30. Finally, the internal sheet metal plate 28 is placed over the external sheet metal plate 26 by folding by 180°, whereby the sheet metal parts 26, 28 are also connected to one another via a fold 42 (FIG. 7). The connecting toes 32 are aligned with the recesses 30 so that they are able to perform their function when the sheet metal strip 36 is bent around the bending edge 52. According to this variation, an end area can be reinforced in a simple manner—for example, at the hook-shaped end of the wiper rod 18.

FIG. 8 shows an application variation of the invention, according to which the external sheet metal plate 26 and the internal sheet metal plate 28 are of the same length. In this case, the corresponding component is composed over its entire length of two sheet metal layers. In comparison to a correspondingly stronger one-layer component, this offers the advantage that different materials can be used for the individual sheet metal layers in order to obtain, for example, a lower weight or better deformability. For the targeted reinforcement of individual areas, one variation expediently provides a partial reinforcing sheet metal plate 44, which is substantially shorter than the external sheet metal plate 26 and is only arranged at a heavily stressed location (FIG. 9). In both variations, the external sheet metal plate 26 exclusively forms the outer contour of the component, and the internal sheet metal plate 28 or the reinforcing sheet metal plate 44 is completely covered.

The process on which the invention is based can also be used to connect two sheet metal parts 46, 48 to one another (FIG. 10). The sheet metal parts 46, 48 overlap in a connection area 50, whereby a first sheet metal part 46 is fashioned as an external sheet metal plate with connecting toes 32 and a second sheet metal part 48 is fashioned as an internal sheet metal plate with recesses 30. As a result of the bending process around the bending edge 52, the first sheet metal part 46 and the second sheet metal part 48 are connected to one another free of play. So that the outer contour of the second sheet metal part 48 is adapted to the outer contour of first sheet metal part 46, a step 58, whose height corresponds to the material thickness of the first sheet metal part 46, is impressed in the second sheet metal part 48 towards the connection area 50.

What is claimed is:

1. Wiper arm (10), which includes a fastening part (14) and an articulated part (16) with a wiper rod (18), of which at least one part (14, 16, 18) is fabricated of sheet metal by stamping and bending, and features at least one area with a plurality of sheet metal layers (26, 28), characterized in that an external sheet metal plate (26) and an internal sheet metal plate (28) lying on top of one another are jointly bent around a bending edge (52), whereby the external sheet metal plate (26) features connecting toes (32) on its side edges (54) that run longitudinally to the bending edge (52), which engage in matching recesses (30) on the corresponding side edges (56) of the internal sheet metal plate (28), and, after bending under an initial tension, the internal sheet metal plate (28) is adjacent to the external sheet metal plate (26).

2. Wiper arm (10) according to claim 1, characterized in that the sheet metal plates (26, 28) are composed of different materials.

3. Wiper arm (10) according to claim 1, characterized in that the external sheet metal plate (26) and the internal sheet metal plate (28) are formed from a sheet metal strip (36) and placed on top of one another via folding by 180°, whereby the fold (42) runs transverse to the bending edge (52).

4. Wiper arm (10) according to claim 1, characterized in that the internal sheet metal plate (28) is a partial reinforcing sheet metal plate (44).

5. Wiper arm (10) according to claim 1, characterized in that a first sheet metal part (46) is connected to a second sheet metal part (48) by overlapping the two sheet metal parts (46, 48) in a connection area (50) and one of the sheet metal parts (46, 48) is fashioned as the external sheet metal plate (26) and one as the internal sheet metal plate (28).

6. Wiper arm (10) according to claim 5, characterized in that the second sheet metal part (48) fashioned as the internal part (26) features a step (58) towards the connection area (50), whose height corresponds to the sheet metal thickness of the first sheet metal part (46).

7. Process to manufacture a wiper arm according to claim 1, characterized in that the contours of the external sheet metal plate (26) and the internal sheet metal plate (28) are stamped out of sheet metal in a first procedural step, that the connecting toes (32) are bent in a second procedural step, that the external sheet metal plate (26) is placed on the internal sheet metal plate (28) in a third procedural step so that the connecting toes (32) are aligned with the recesses (30), and that the external sheet metal plate (26) and the internal sheet metal plate (28) are jointly bent around a bending edge (52) in a fourth procedural step.

8. Process according to claim 7, characterized in that the external sheet metal plate (26) and the internal sheet metal plate (28) are stamped out of a sheet metal strip (36) arranged one after the other in the direction of the bending edge (52) and folded together in such a way that they are lying on top of one another and the connecting toes (32) are aligned with the recesses (30).

* * * * *